(12) United States Patent
Spears

(10) Patent No.: US 6,481,948 B2
(45) Date of Patent: *Nov. 19, 2002

(54) SYSTEM FOR ADAPTING AND MOUNTING INDUSTRIAL AND AGRICULTURAL WORK IMPLEMENTS TO A PICKUP TRUCK

(76) Inventor: Lonnie K. Spears, 2716 W. Eppler Dr., Durant, OK (US) 74701

( * ) Notice: Subject to any disclaimer, the term of this patent is extended or adjusted under 35 U.S.C. 154(b) by 0 days.

This patent is subject to a terminal disclaimer.

(21) Appl. No.: 09/789,153

(22) Filed: Feb. 20, 2001

(65) Prior Publication Data

US 2002/0113407 A1 Aug. 22, 2002

(51) Int. Cl.$^7$ .............................................. A01B 59/043
(52) U.S. Cl. ........................ 414/498; 414/392; 172/439; 280/416.1
(58) Field of Search ................................. 414/498, 392; 280/416.1, 417.1; 172/439, 440, 677

(56) References Cited

U.S. PATENT DOCUMENTS

| | | |
|---|---|---|
| 3,698,740 A | 10/1972 | Chisholm et al. |
| 3,883,020 A | 5/1975 | Dehn |
| 3,955,831 A | 5/1976 | Whitchurch |
| 3,993,325 A | 11/1976 | Gravett |
| 4,090,624 A | 5/1978 | Krein et al. |
| 4,383,792 A | 5/1983 | Seabloom et al. |
| 4,832,358 A * | 5/1989 | Bull ........................ 280/418.1 |
| 4,940,096 A | 7/1990 | Johnson |
| 5,150,999 A | 9/1992 | Dugan |
| 5,232,329 A | 8/1993 | Livingston |
| 5,269,642 A | 12/1993 | Zoromski |
| 5,324,061 A | 6/1994 | Lay |
| 5,423,394 A | 6/1995 | Kendle |
| 5,690,182 A | 11/1997 | Ward |
| 5,788,257 A | 8/1998 | Meyerhofer |
| 5,797,614 A | 8/1998 | Hord et al. |
| 6,148,928 A * | 11/2000 | Spears ........................ 172/439 |

* cited by examiner

Primary Examiner—Eileen D. Lillis
Assistant Examiner—Charles Fox
(74) Attorney, Agent, or Firm—Robert H. Frantz; Robert W. Brown

(57) ABSTRACT

A frame apparatus and system that provides the use of standard tractor-mounted agricultural and industrial work implements with a pickup truck or comparable flat-bed vehicle. Disclosed embodiments provide for the use of commercially available short-line front-end loaders and various effectors suitably adapted for use therewith. The system can be mounted and dismounted with implements attached, and connects to the host vehicle via a bed-mounted gooseneck hitch and frame- or bumper-mounted square hitch receiver.

10 Claims, 6 Drawing Sheets

SYSTEM FOR ADAPTING AND MOUNTING INDUSTRIAL AND AGRICULTURAL WORK IMPLEMENTS TO A PICKUP TRUCK

FEDERALLY SPONSORED RESEARCH AND DEVELOPMENT STATEMENT

This invention was not developed in conjunction with any Federally sponsored contract.

TECHNICAL FIELD OF THE INVENTION

This invention relates to the field of industrial and agricultural work implements, such as front loaders and blades, and more specifically the mounting system for mounting commercially available, standard agricultural and industrial work implements to pick up truck and other non-tractor conventional vehicles.

CROSS-REFERENCE TO RELATED APPLICATIONS Not applicable.

BACKGROUND OF THE INVENTION

The use of work implements such as front-end loaders, personnel lifts, fork lifts, post hole diggers, and grading blades is ubiquitous throughout society. Implements of any considerable size require a source of power to push, pull, or generally move the implement, and often require a source of hydraulic power, the obvious exceptions being smaller, manual implements such as a hand-held shovel or post hole digger. Most are designed to be mounted on and used with tractors of various sizes, ranging from small garden tractors to large farm tractors of 150 HP or larger.

As the economics of agriculture change, the need to improve efficiencies throughout farming operations grows. Costs of fuel, equipment, land, fertilizer, feed, and other agricultural components continue to rise without a commensurate rise in the price of agricultural commodities such as beef, pork, cotton, corn, soybeans, grain sorghum, etc. In balance, farmers of all sizes and varieties are forced to reduce costs wherever possible. Farmers will typically have a plurality of tractors which vary in size. The larger tractors usually being used for jobs requiring substantial power such as breaking soil, cultivating and tilling row crops, and harvesting crops. Smaller tractors might be used for moving hay bales, digging post holes, digging trenches, grading turn rows, or moving and loading small quantities of top soil, gravel, or caleche.

In none-agriculture industries and businesses, many of the same economic pressures exist. With rising costs and increasing emphasis on fuel economy and raw material conservation, it is important to avoid duplication of equipment wherever possible. In many types of businesses a pickup or flat bed truck-type vehicle is needed for carrying cargo. At times there may be an additional need for typically truck mounted implements such as a fork lifts, personnel lifts or clamp trucks. The invention disclosed herein provides for a pickup truck to be equipped with an off-the-shelf front end loader apparatus which can then be fitted with commercially available off-the-shelf attachments providing for the front end loader to be used as a fork lift, personnel lift, or clamp truck, thus eliminating the need to purchase that fork lift, clamp truck or personnel lift at significant cost.

Commercial tractor-borne front end loaders generally fall within two categories: in-line and short-line. In-line loaders are typically manufactured for specific tractors or series of tractors and usually manufactured by the same company which manufactures the tractor. For example, a Ford front end loader manufactured for a Ford model 300 or 300 series tractor. By contrast, short-line loaders are typically manufactured to be compatible with a wide variety of tractors and require a mounting kit that provides for mating. A countless number of mounting kits is currently commercially available. This is necessitated by the number of short-line tractor-mounted equipment manufacturers coupled with the number of tractors manufacturers, both domestic and imported.

Others have proposed implements for use in truck beds where the implements are removable when not in use, but these devices have generally required special modifications of the truck frame and/or bed and interfere noticeably with the cargo-carrying capacity of the vehicle. Another limitation of currently available devices has been the general requirement for special equipment to assist in loading and unloading these implements, thus limiting versatility.

More importantly, currently available implements which do not require significant modification to the host vehicle and which do not impede the cargo-carrying capacity of the host vehicle unfortunately consist of implements which are designed specifically for that host vehicle, and thus do not allow the use of third-party, short-line implements.

For example, U.S. Pat. No. 3,883,020 to Dehn discloses a truck mounted implement carrying frame which can be loaded and unloaded without requiring significant modification to the host vehicle. However, any implement used in conjunction with the Dehn frame must be manufactured specifically for use with the Dehn frame, not only limiting available implements, but likely increasing the cost of each implement, as custom-built implements are required.

Therefore, there is a need in the art for a system and method to mount commercially-available agricultural and industrial implements to a pickup truck. There exists a further need in the art for this system and method to allow the mounting of so-called short-line implements through the use of available adapter kits. Additionally, there exists a need in the art for a system and method such as this which does not require significant modifications to the host pickup truck, and especially avoids modifications which may impede or reduce the normal cargo carrying capability of the pickup truck. Further, there is a need in the are for this system and method to preferably allow the system to be installed and de-installed from the host pickup truck by a single operator in order to realize maximum usefulness in a small farm or industrial situation. There is an additional need in the art for this system to provide power to the implement, hydraulic or otherwise, to allow the implement to be operated and used similarly as if it were mounted to a tractor.

SUMMARY OF THE INVENTION

The system and method of the invention provide a frame which, when mounted to a common pickup truck bed, receives commercially available "off-the-shelf" short-line implements, such as loaders, and the wide variety of commercially available implements designed for use therewith. The frame mounts to the pickup using common trailer hitch means, including a goose neck hitch and bumper- or frame-mounted square hitch receivers, thereby avoiding unusual and custom modifications to the pickup truck that may interfere with its capacity to haul cargo when not in use with an implement. Equipment such as front-end loaders and various attachments for front-end loaders such as fork lifts and personnel lifts can be mounted and used.

Thus, the invention allows many of the jobs currently done by small tractors to be done with a common pickup truck. Through use of the invention, farmers may improve their operating economics by eliminating redundant equipment, and making greater use of equipment they already own such as pickup trucks and tractor implements.

BRIEF DESCRIPTION OF THE DRAWINGS

The figures presented herein when taken in conjunction with the disclosure form a complete description of the invention.

DETAILED DESCRIPTION OF THE INVENTION

The mounting system consists of a frame assembly which mounts to a standard pickup or flatbed truck, and which accepts standard short-line "off-the-shelf" front-end loader assemblies designed to be mounted to and used with a tractor, as well as other associated work implements. To accept the frame assembly, a vehicle should be equipped with a standard bed-mounted goose neck ball hitch, and either two symmetrically spaced frame-mounted square hitch receivers mounted below the rear bumper, or a single square hitch receiver centrally mounted below the rear bumper.

Figure 2:
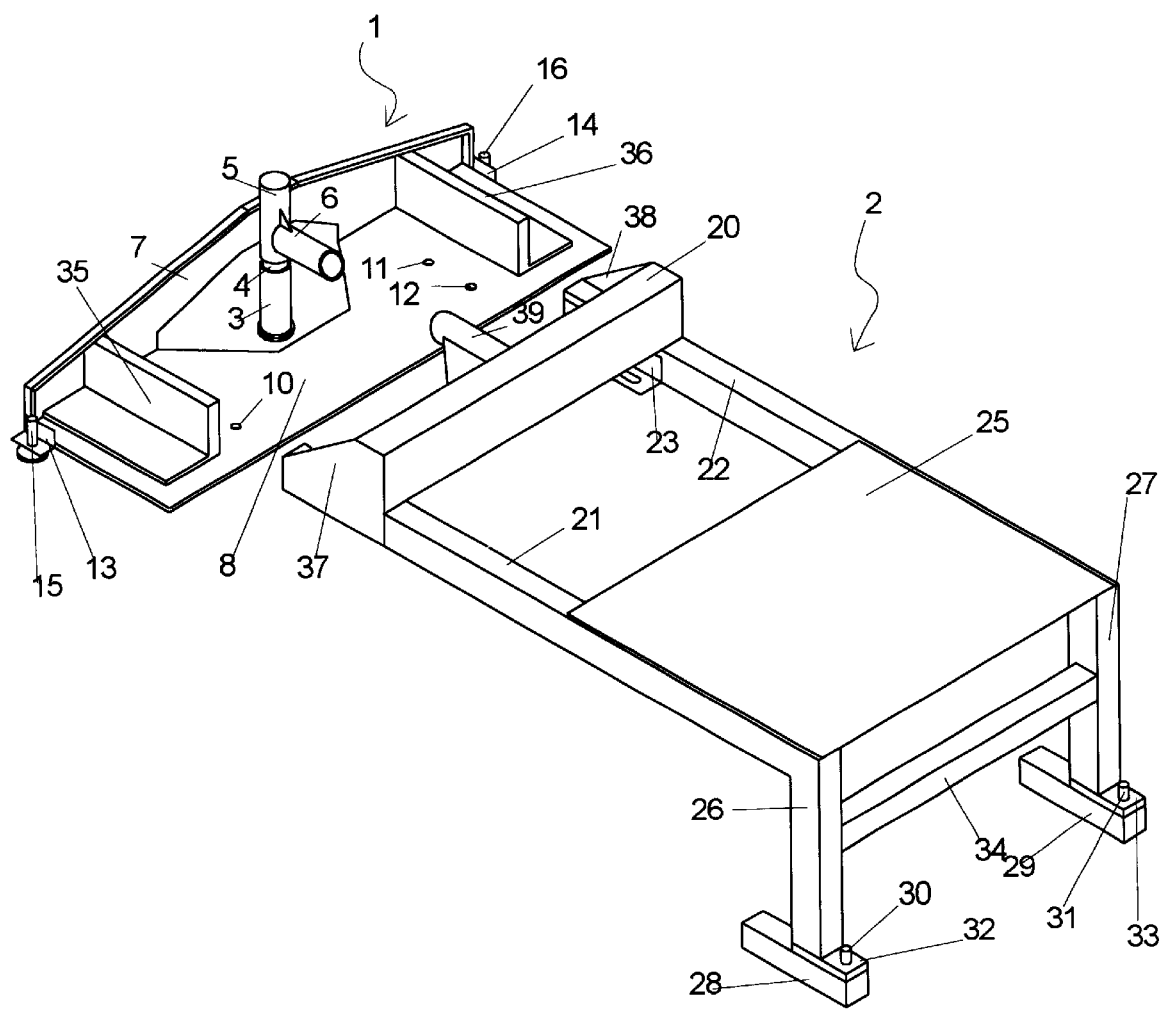
FIG. 2 shows the basic frame assembly divided into front and rear sub-assemblies.

Referring first to FIG. 2, the frame assembly (100) is composed of forward subassembly (1) and rear subassembly (2). Forward subassembly (1) is composed of vertical goose neck hitch receiver (3), vertical adjustment insert (4), top cap (5), horizontal adjustment insert (6), front frame plate (7), base frame plate (8), a plurality of adjustment holes (9–12) (9 not shown in the view of FIG. 2), front stabilizing feet (15, 16), front stabilizing feet support brackets (13, 14), and universal mounting plates (35, 36).

The rear subassembly (2) is composed of horizontal adjustment tube (39), forward cross member (20), longitudinal spine members (21, 22), reinforcing plates (37, 38), slotted brackets (23, 24) (24 not shown in FIG. 2), table member (25), vertical leg members (26, 27), rear hitch inserts (28, 29), rear mounting studs (30, 31), rear foot members (32, 33) and rear cross member (34).

Continuing to refer to FIG. 2, goose neck hitch receiver (3) is axially aligned with and fixed to vertical adjustment insert (4), which is slidably disposed within top cap (5). This configuration allows for vertical adjustment of the frame assembly which can then be fixed via tightening means such as a large set screw, winged bolt or cotter pin.

The goose neck hitch receiver (3) represents the primary load bearing point for the front part of the combined frame assembly (100), thus it is recommended that the goose neck hitch be located forward of the rear axle of host vehicle in order to improve overall weight distribution. Top cap (5) is vertically oriented and rigidly attached to front frame plate (7). Front frame plate (7) is rigidly attached to base frame plate (8), such as by welding, rivets or other suitable method, so as to maintain a substantially perpendicular orientation therewith.

Adjustment holes (9–12) are located through base plate (8), and they are preferably tapped so as to receive tightening bolts placed through the slots of slotted brackets (23) and (24), with slotted bracket (23) situated over adjustment holes (11) and (12), and slotted bracket (24) (not shown) situated over adjustment holes (9 and 10) (9 not shown in view of FIG. 2).

The front stabilizing feet support brackets (13) and (14) are rigidly attached to both front frame plate (7) and base frame plate (8). Front stabilizing feet (15) and (16) are slidably disposed within support brackets (13) and (14) respectively, are each vertically adjustable, and may be fixed by a number of temporary fastening means after adjustment, such as by set screw or cotter pins.

Horizontal adjustment insert (6) is rigidly attached to top cap (5) such that the axis is oriented substantially perpendicular to both top cap (5) and front frame plate (7). Rear subassembly (2) is composed of longitudinal spine members (21, 22), each being aligned substantially parallel to the longitudinal axis of the vehicle on which the frame assembly is mounted.

Forward cross member (20) is substantially parallel and rigidly attached to the forward end of longitudinal spine members (21) and (22) with reinforcing plate (37) rigidly attached to forward cross member (20) and longitudinal spine member (21) and reinforcing plate (38) rigidly attached to forward cross member (20) and longitudinal spine member (22) to reinforce the structural integrity therein. Horizontal adjustment tube (39) is rigidly attached to the front face of forward cross member (20) so as to be substantially parallel with longitudinal spine members (21) and (22). Horizontal adjustment tube (39) is situated concentric with horizontal adjustment insert (6) and sized to accept it therein. In the operational configuration, horizontal adjustment insert (6) is slidably disposed within horizontal adjustment tube (39) to enable manual adjustment thereof which can then be fixed via tightening means such as a set screw, winged bolt or cotter pin. Table member (25) is attached to and between longitudinal spine members (21) and (22), provides a mounting surface for hydraulic power equipment, and is further described in the discussion of FIG. 3. Vertical leg members (26) and (27) are vertically oriented and rigidly attached to the rear ends of longitudinal spine members (21) and (22) respectively with rear cross member (34) rigidly attached between. Rear hitch inserts (28) and (29) are inserted into class IV square hitch receivers correspondingly mounted under the rear bumper of host vehicle and provide a landing for rear foot members (32) and (33) respectively. Rear mounting studs (30) and (31) are disposed through concentric holes placed through rear foot members (32) and (33) in order to provide structurally secure, yet easily removable connection points for the rear of frame assembly.

Figure 1:
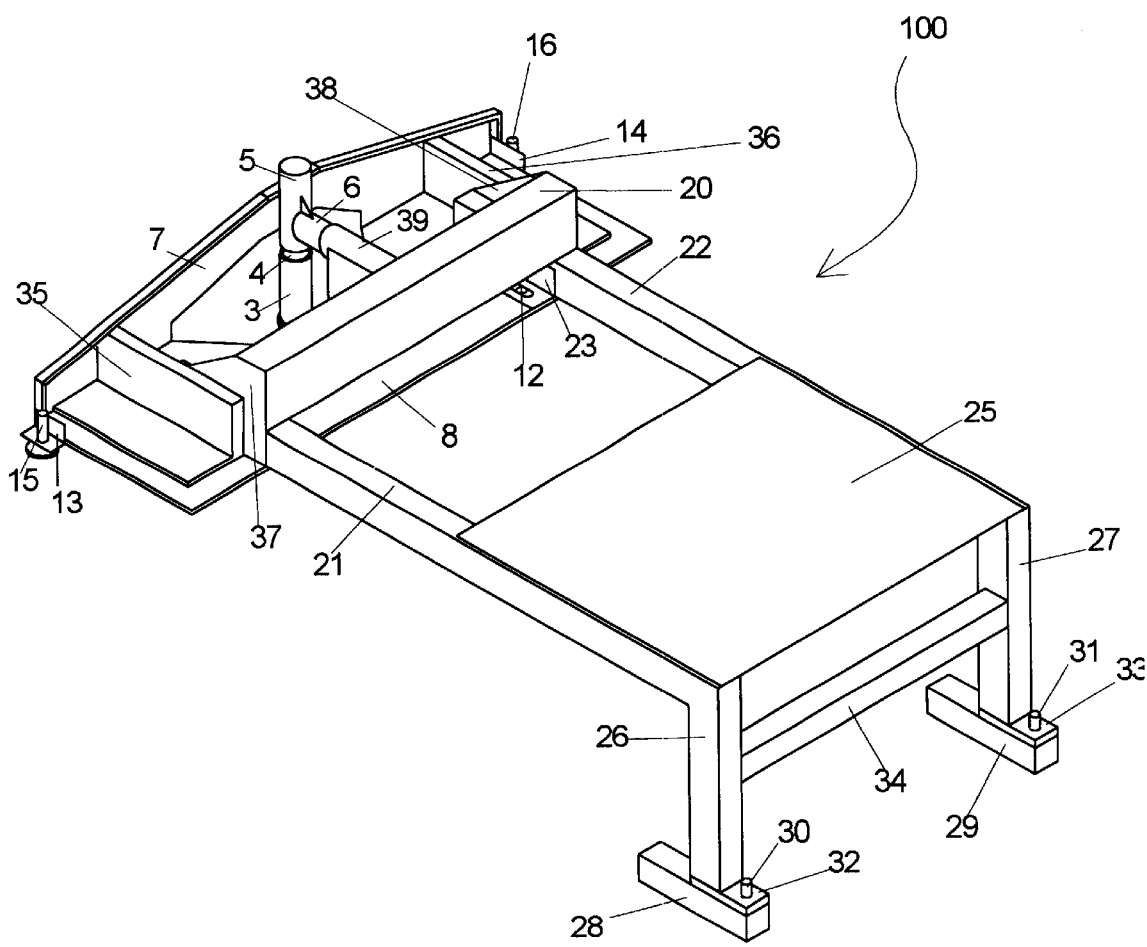
FIG. 1 shows a perspective view of the basic frame assembly.

Referring now to FIG. 1 which shows the basic frame assembly (100), including front subassembly (1) and rear subassembly (2) joined together. As the two sub-assemblies are mated together, horizontal adjustment insert (6) is fitted inside horizontal adjustment tube (39), adjustment holes (11)

and (12) are aligned with the slots of slotted bracket (23), and adjustment holes (9) and (10) and aligned with the slots of slotted bracket (24). Adjustment holes (9), (10) and (11) and slotted bracket (24) are not shown in the view of FIG. 1. Sub-assembly (2) can be moved longitudinally with respect to subassembly (1) to adjust the overall length of frame assembly (100). After adjustment is made, the overall length can be fixed by any number of fastening means such as large set screws, winged bolts or cotter pins located through horizontal adjustment tube (35).

Height adjustment of the frame (100) may be accomplished by sliding top cap (5) up or down along the concentric axis of top cap (5) and vertical adjustment insert (4). As previously stated, the vertical position of top cap (5) can be fixed, after adjustment, by any number of fastening means such as set screws, winged bolts or cotter pins. Specific fastening means for vertical and horizontal adjustment may be selected according the weight and load anticipated by the frame (100).

Figure 3:
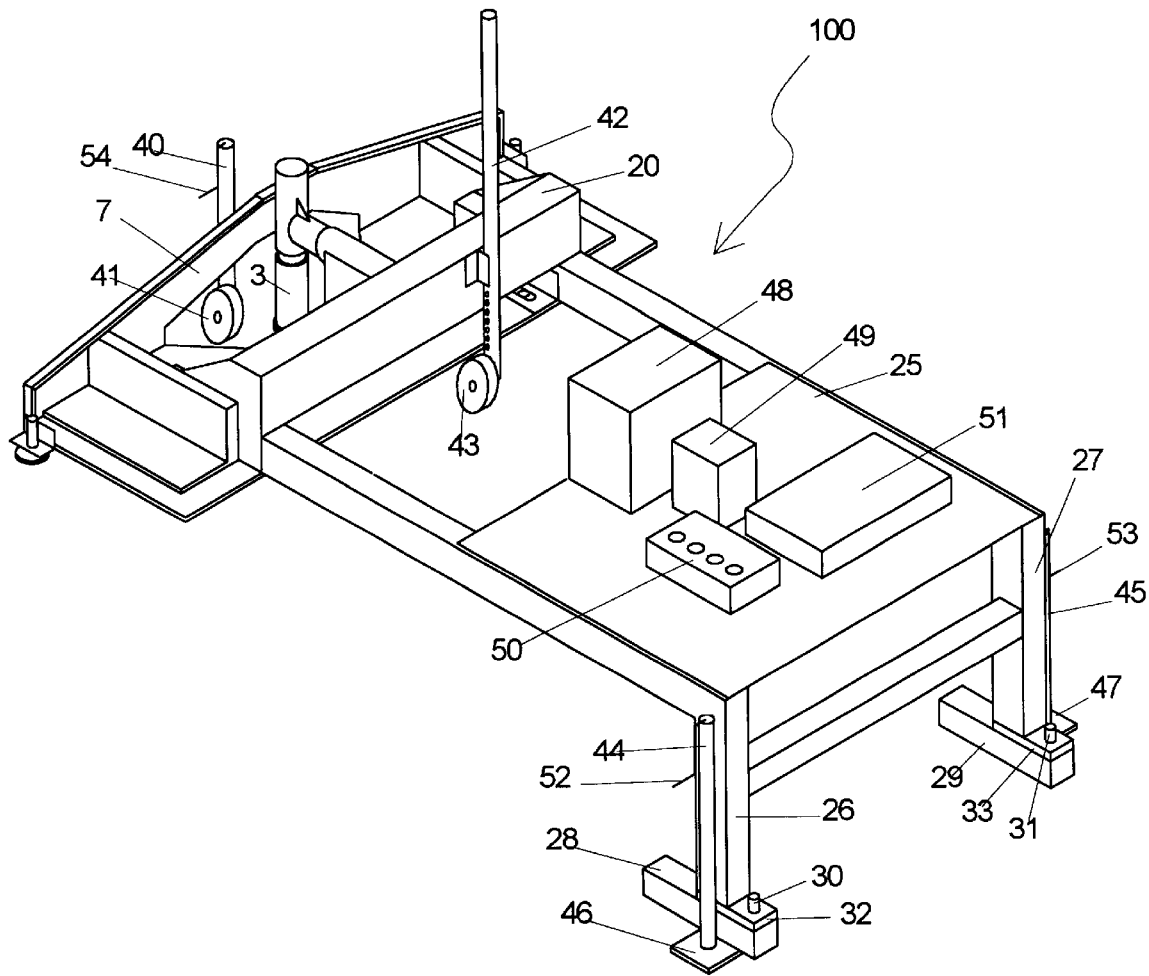
FIG. 3 shows a perspective view of the same frame assembly highlighting the front jack wheel, front stand assembly, rear stand assembly, and hydraulic power apparatus.

Referring now to FIG. 3 which shows a frame assembly (100) equipped with apparatus needed to load and unload the frame assembly to and from host vehicle by a single operator. FIG. 3 also includes apparatus needed to provide hydraulic power to a mounted implement. To unload subject frame assembly, host vehicle is backed into the location where frame assembly is to be stored. Left telescoping jack stand (44) and right telescoping jack stand (45) are lowered by means of crank arms (52) and (53), respectively, until said stands carry the entire rear weight load of the frame assembly (100).

Jack stands (44) and (45) are then further lowered until the rear of the frame assembly is raised such that rear foot members (32) and (33) are clear of mounting studs (30) and (31) respectively. Preferably, a storage location will be chosen which provides for rear jack stand bases (46) and (47) to sit upon a firm, level surface.

Next, front telescoping jack stand (40) is lowered by means of crank arm (54), eventually causing contact between front jack stand wheel (41) and host vehicle bed surface. Front jack stand (40) is further lowered, raising the front of the frame assembly until gooseneck hitch receiver (3) is clear of the host vehicle hitch ball. At this point, the host vehicle can be pulled forward until center locking jack stand (42) wheel (43) is clear of the rear bumper of host vehicle, as the vehicle is pulled forward and the assembly is left stationary.

At this point, the center locking jack stand can be unlocked, allowing center locking jack stand wheel (43) to fall to ground level, then re-locked. Numerous locking jack stands of this type are commercially available. The host vehicle can then continue forward movement, leaving the frame assembly resting securely and independently in a tripod fashion on rear jack stands (44) and (45) and center locking jack stand (42).

Figure 5:
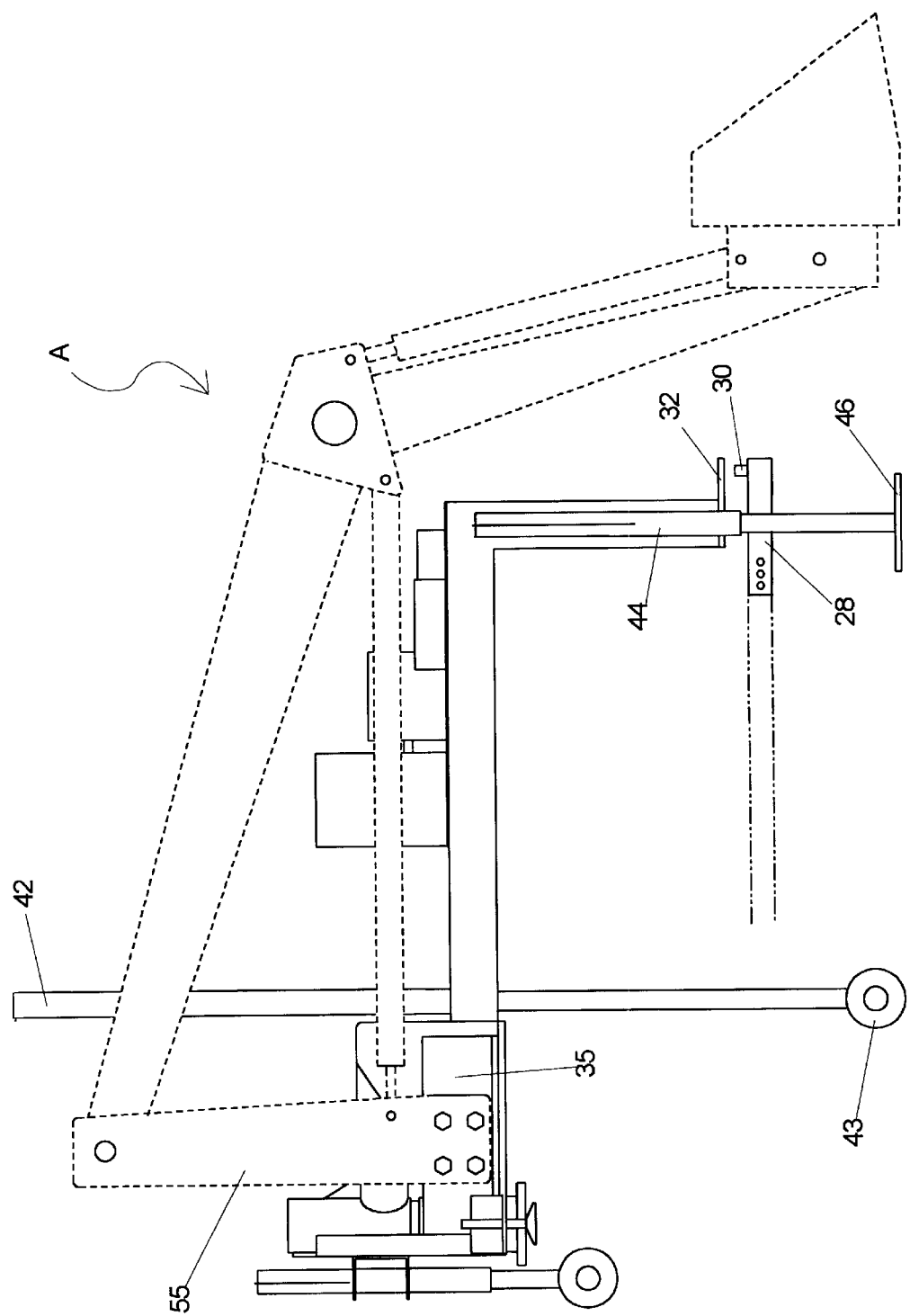
FIG. 5 shows a side view of the frame assembly with an attached implement in the dismounted and stored configuration.

FIG. 5 shows a side view of the frame assembly system in the stored configuration with center locking jack stand wheel (43) and rear jack stand bases (46 and 47) (47 not shown in FIG. 5) supporting the weight of the entire frame structure. Important to the scope of this invention, the frame system is designed to be dismounted, stored and remounted with an implement attached as shown. The steps necessary to mount or dismount the frame assembly are the same regardless of the presence or absence of an attached implement.

FIG. 5 further shows a preferred embodiment of this invention with a short-line front-end loader attachment (A) attached to the frame assembly by means of mounting kit (55) which is bolted to mounting plate (35). Not shown in detail in FIG. 5 is a commercially available mounting kit bolted to mounting plate (36), hidden from view in FIG. 5. Note that mounting plates (35) and (36) are oversized and designed to accept a wide variety of commercially available mounting kits.

To attach a mounting kit, the specific bolt pattern should be marked, then the necessary holes can be accurately drilled and tapped in mounting plates (35) and (36) to enable a mounting kit to then be securely bolted to the frame assembly. FIG. 5 further shows front-end loader attachment (A) equipped with an optional bucket attachment.

It is important to note that a wide range of attachments and implements are commercially available, which can easily be mated to a typical short-line front-end loader assembly such as the one shown (A) in lieu of the bucket attachment shown. Examples include fork lift effectors, grading blades, hay bale spikes and forks, personnel lift attachments, and others too numerous to name. The invention described herein provides the means for these implements to be used with a pickup truck or other flat bed vehicle in lieu of a tractor.

A preferred embodiment for supplying hydraulic power to an attached implement is shown in FIG. 3. A gasoline engine (48) is coupled to hydraulic pump (49). Hydraulic fluid reservoir (51) holds sufficient fluid and reserve to operate standard implements. Hydraulic valve assembly (50) contains two standard hydraulic valves, four standard connection ports, and the controls necessary to interface with off-the-shelf hydraulic powered implements. In an alternative embodiment, an electric motor is substituted for the gasoline powered engine (48). The gasoline powered engine, alternative electric motor, hydraulic pump, fluid reservoir, and valve assembly used may be selected from a variety of commercially available units and are beyond the scope of this invention. In each embodiment, the engine, hydraulic pump, reservoir, valve assembly and associated equipment are situated upon and fixed to table member (25).

Figure 4A:
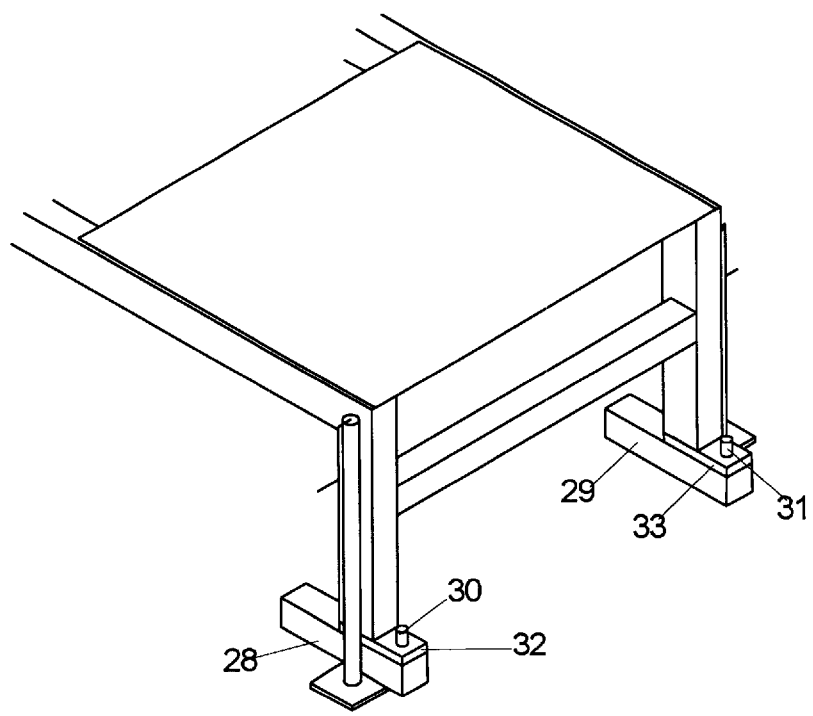
FIGS. 4a and 4b shows a perspective comparative view of the two rear hitch point and alternative one rear hitch point configuration.
Figure 4B:
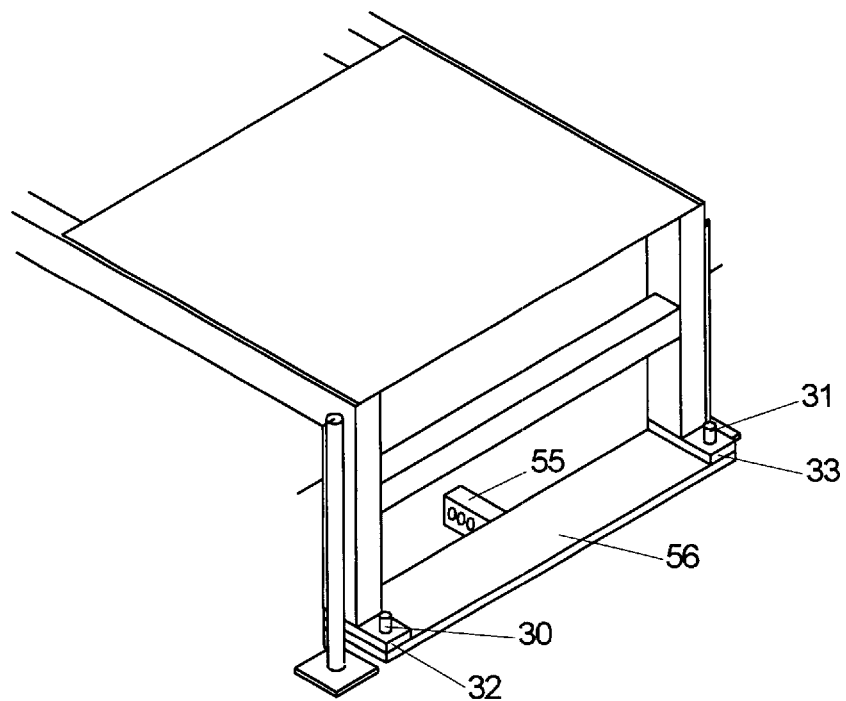

FIGS. 4a and 4b show alternative embodiments of the frame assembly. In FIG. 4a, the preferred embodiment as disclosed and discussed supra with rear hitch inserts (28) and (29) securely inserted into standard class 4 square hitch receivers correspondingly mounted under the rear bumper of host vehicle. In this embodiment, rear hitch inserts (28) and (29) provide a mounting base for the rear of the frame assembly as previously discussed. In FIG. 4b, an alternative embodiment is shown wherein only one square hitch receiver is required. In the alternative embodiment, a single square hitch receiver is centrally mounted to the truck frame under the rear of host vehicle. Central hitch insert (55) is positioned into said hitch receiver and secured therein. Central hitch insert (55) is rigidly attached to rear base plate (56) which is of sufficient width to span the frame assembly. Alternative rear mounting studs (57) and (58) are rigidly fixed to base plate (56) and positioned to accept rear foot members (32) and (33) respectively thereon. For lighter duty embodiments, other classes of square hitch receivers may be employed.

Figure 6A:
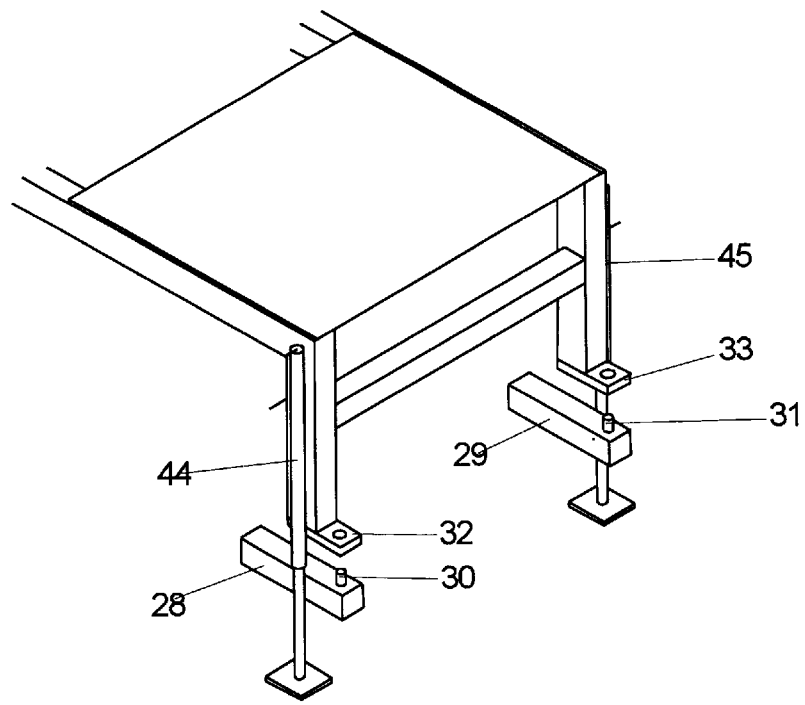
FIGS. 6a and 6b shows the alternative rear hitch configurations in raised positions above each respective mounting points.
Figure 6B:
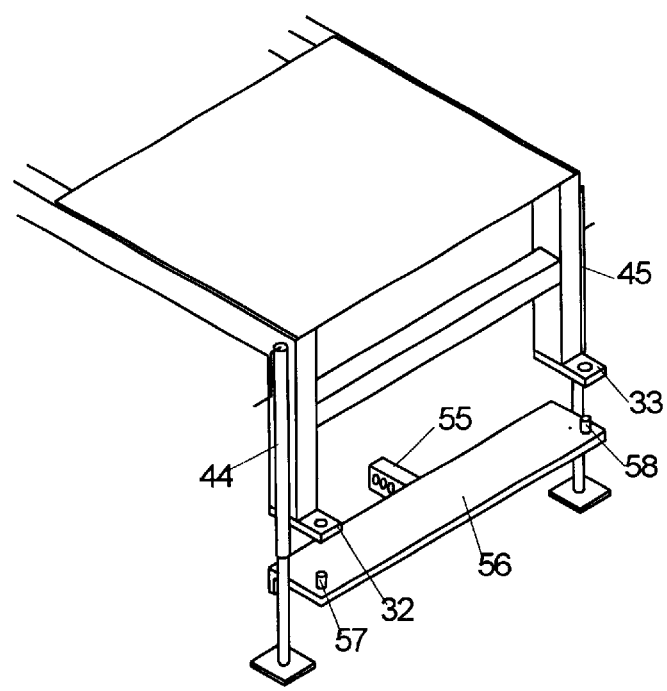

For further clarification, FIGS. 6a and 6b show both rear frame embodiments after having been raised off the hitch inserts and/or base plate. FIG. 6a shows rear foot members (32) and (33) raised above and clear of hitch inserts (28) and (29) and mounting studs (30) and (31) respectively. FIG. 6b shows rear foot members (32) and (33) raised above and clear of rear base plate (56) and rear mounting studs (57) and

(58) respectively. In both embodiments, rear telescoping jack stands (44) and (45) raise the frame up and off the inserts or base plate.

While the invention has been set forth in this disclosure with respect to the preferred embodiment, and in some cases optional embodiments have been set forth, it will be appreciated by those skilled in the art that there are many ways to implement the structural design of subject implement frame system without departing from the spirit and scope of the invention and disclosure herein.

The embodiments shown and described above are exemplary. Many details are found in the art, therefore, many such details are neither shown nor described. Even though numerous characteristics and advantages of the present invention have been shown in the drawings and accompanying text, the description is illustrative only, and changes may be made in the detail, especially in matters of size, shape and arrangement of parts within the principles of the invention to the full extent indicated by the broadest possible meaning of the terms of the attached claims. Further, not all details and features of the invention as disclosed must be adopted to realize the invention. The limits of the inventions and bounds of the patent protection are measured by and defined in the following claims.

What is claimed is:

1. An apparatus for removably mounting work implements to a pickup truck, flat bed truck or comparable host vehicle equipped with a gooseneck hitch and at least one rear frame- or bumper-mounted square hitch receiver comprising:
    a front hitch assembly comprising an upper end and a lower end, said lower end capable of fitting over said gooseneck hitch;
    a front frame plate having left and right sides and rigidly attached to said upper end of front hitch assembly;
    a horizontal adjustment assembly having a forward end and rear end, said forward end rigidly attached to said upper end of said front hitch assembly;
    a frame assembly having a forward end, rear end, left side, and right side, said forward end rigidly attached to said rear end of said horizontal adjustment assembly;
    a rear hitch means capable of being inserted into and supported by said square hitch receiver and further capable of supporting said rear end of frame assembly;
    a first implement mounting assembly rigidly attached to said left side of front frame plate and suitable for connection to short-line implement mounting kits; and
    a second implement mounting assembly rigidly attached to said right side of front frame plate and suitable for connection to short-line implement mounting kits.

2. The apparatus of claim 1, wherein said first and second implement mounting assemblies comprise:
    a first base plate oriented substantially horizontal and being rigidly attached to said left side of front frame plate;
    a second base plate oriented substantially horizontal and being rigidly attached to said right side of front frame plate;
    a first mounting plate oriented substantially vertical and substantially parallel with the longitudinal axis of said vehicle and being rigidly attached to said first base plate; and
    a second mounting plate oriented substantially vertical and substantially parallel with the longitudinal axis of said vehicle and being rigidly attached to said second base plate.

3. The apparatus of claim 1, wherein said horizontal adjustment assembly comprises:
    a rear tube member rigidly attached to said forward end of said frame assembly;
    a forward tube member rigidly attached to said upper end of said front hitch assembly and slidably disposed within said rear tube member; and
    a horizontal fastening means capable of retaining said forward tube member within said rear tube member in a fixed relative position.

4. The apparatus of claim 1, wherein said front hitch assembly comprises;
    an upper tube member oriented substantially vertical and rigidly attached to said forward tube member of said horizontal adjustment assembly;
    a lower tube member having an upper and lower end, said lower end suitable for fitting over said gooseneck hitch, said upper end slidably disposed within said upper tube member; and
    a vertical fastening means capable of retaining said lower tube within said upper tube in a fixed relative position.

5. The apparatus of claim 1, wherein said rear hitch means comprises:
    at least one square hitch insert having a top side and a bottom side and suitable for being accepted into a centrally located square hitch receiver; and
    a support plate oriented substantially horizontal and substantially parallel with a lateral axis of said vehicle and rigidly attached to top side of said square hitch insert, said support plate further capable of supporting said rear end of frame assembly.

6. The apparatus of claim 1 further comprising:
    a hydraulic power means for supplying hydraulic power to work implements attached therewith.

7. The apparatus of claim 6 wherein hydraulic power means comprises:
    a rotational power source;
    a hydraulic pump coupled with said rotational power source;
    a hydraulic fluid reservoir suitably connected with said hydraulic pump to provide hydraulic fluid as needed by said hydraulic pump for operation;
    a valve assembly connection means suitable to provide a working interface with work implements attached therewith.

8. The apparatus of claim 7, wherein said rotational power source comprises:
    an electric power source; and
    an electric motor, receiving energy from said electric power source.

9. The apparatus of claim 7, wherein said rotational power source comprise a gasoline powered engine.

10. The apparatus of claim 1 further comprising:
    a retractable front vertical leg disposed substantially near said front side of frame assembly;
    a lowerable left rear jack stand disposed on said left side of frame assembly substantially near the rear;
    a lowerable right rear jack stand disposed on said right side of frame assembly substantially near the rear such that when said right rear jack, said left rear jack stand, and said front vertical leg are operated to their lowered positions the apparatus stands freely on a surface.

* * * * *